May 21, 1929. C. F. O'NEILL 1,714,317
AUTOMOBILE LIGHT
Filed March 22, 1928
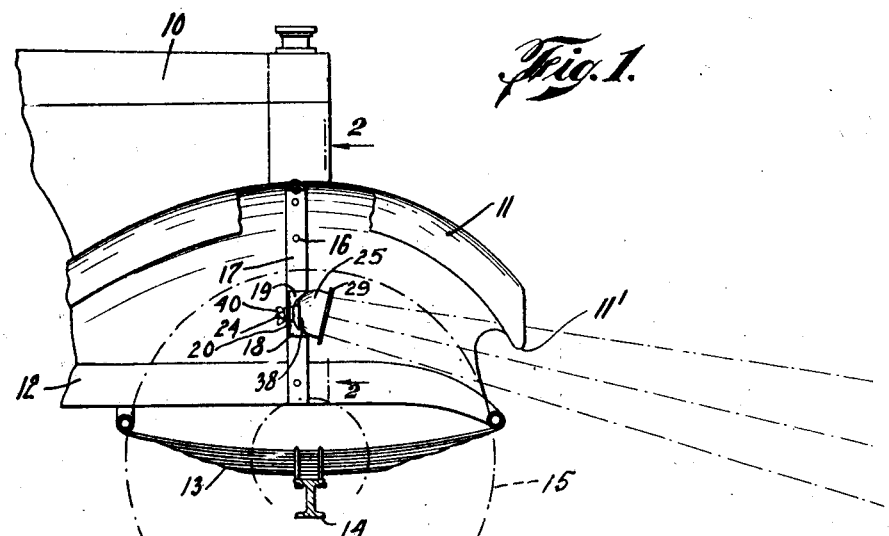
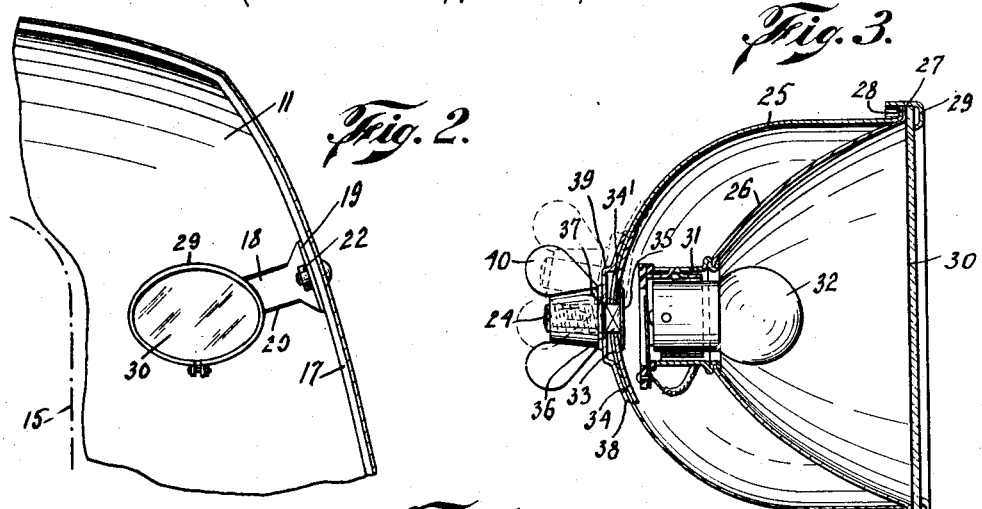
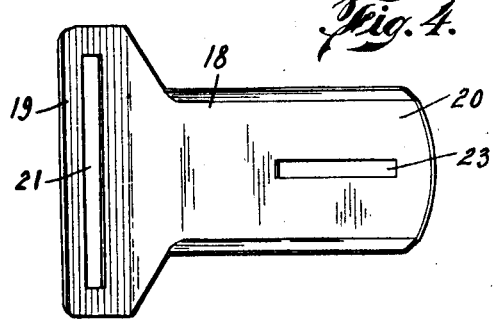
INVENTOR
C. F. O'Neill
BY
Sigmund Herzog
ATTORNEY Patented May 21, 1929.

1,714,317

UNITED STATES PATENT OFFICE.

CHARLES F. O'NEILL, OF NEW YORK, N. Y.

AUTOMOBILE LIGHT.

Application filed March 22, 1928. Serial No. 263,664.

The present invention relates to improvements in lamps for motor vehicles, and more particularly to supplemental headlights therefor.

Heretofore, in addition to the ordinary headlights, supplemental lamps, commonly called spotlights, have been used on motor vehicles, their purpose being to obtain illumination of the road in front of the motor vehicle at such places or localities where the headlights cannot be operated at full power. Attempts have been made to so locate or mount the spotlights on the motor vehicle that they do not produce a glare in the eyes of approaching pedestrians or drivers of approaching vehicles. For this purpose these spotlights have been mounted under the forward mudguards of the vehicle, more particularly on brackets attached to said mudguards. The difficulties experienced with constructions of this type consists mainly in that no provision is made for proper adjustment of the spotlights or lamps on said brackets.

The main object of the present invention is to provide a construction, preferably in the form of a universal joint between the lamp casing and the bracket, which permits the lamp to be turned in any direction in a vertical plane, and, in addition, allows of shifting of the lamp in any adjusted position longitudinally on the bracket.

Another object of the invention is to produce a lamp of the type mentioned which is simple in construction, efficient in operation, durable in use and capable of manufacture on a commercial scale, or in other words one which is not so difficult to make as to be beyond the reasonable cost of such a contrivance.

With these and other objects in view, which will more fully appear as the nature of the invention is better understood, the same consists in the combination, arrangement and construction of parts hereinafter described, pointed out in the appended claim and illustrated in the accompanying drawings, it being understood that many changes may be made in the size and proportion of the several parts and details of construction within the scope of the appended claim, without departing from the spirit or sacrificing any of the advantages of the invention.

One of the many possible embodiments of the invention is illustrated in the accompanying drawings, in which:—

Figure 1 is a side elevation of the front portion of an automobile equipped with the improved lamp; Fig. 2 is a section taken on line 2—2 of Fig. 1, on a larger scale; Fig. 3 is a central vertical section taken through the lamp; and Fig. 4 is a perspective view of the bracket co-operating with said lamp.

In the drawings, the numeral 10 indicates the hood of an automobile and the numeral 11 one of the front fenders thereof. The forward portion of one of the longitudinal frames of the chassis is indicated at 12, with the same co-operating a front spring 13, supported in any suitable manner on the usual front axle 14. Below the said fender and in spaced relation thereto is disposed one of the front wheels 15, shown diagrammatically in the drawings. To the inner face of the mudguard is attached by rivets 16, or otherwise, a vertically extending metal strip 17, on which is mounted, in a manner presently to be described, a horizontally extending bracket 18. This bracket comprises two sections 19 and 20, extending at right angles to one another, the section 19 abutting against the metal strip 17 and being provided with a vertically extending slot 21, through which is extended a screw bolt 22 carried by the mudguard. This slot permits of adjustment of the bracket on the mudguard in a vertical plane. The section 20 of the bracket is provided with a longitudinal slot 23, to receive a screw bolt 24 on the lamp.

The lamp comprises a housing 25, into which is fitted a reflector 26 of any suitable configuration, the latter being provided at its mouth portion with a flange 27 abutting against a flange 28 on the housing. The reflector is held within the housing by a clamping ring 29, which serves at the same time to secure to the housing a glass front 30. The glass front is, preferably, in the form of an ordinary pane of clear glass. A lamp socket 31 is mounted on the reflector 26, to receive the source of light 32 which is in the form of an electrical incandescent lamp, as usual in constructions of this type. The lamp socket is wholly disposed within the housing 25.

In the case illustrated in the drawings, both the lamp housing and the reflector are elliptical in configuration. In the rear of the housing is formed an aperture 33 and the portion of the housing around this aperture forms part of a spherical surface. Against the inner face of this spherical surface is fitted a curved disk 34, mounted upon the bolt 24 above referred to. The head 35 of the said bolt bears against the exposed face of the said disk, and the latter is provided with a square hole 34' through which the squared portion 36 of said bolt extends. This squared portion of the bolt extends also through a similarly shaped hole 37 in a curved washer 38, the latter fitting the outer face of the spherical portion of the housing. The washer 38 is provided with an outwardly dished portion 39, bearing against the section 20 of the bracket 18.

The bolt 24 extends, as above described, through the slot 23 in said bracket, its threads meshing with those of a wing-nut 40, by means of which the lamp is fixed to the bracket. Both washers are shaped to form part of spherical surfaces, their configuration corresponding to that of the spherical portion of the lamp housing 25. As appears from Fig. 3 of the drawings, the aperture 33 in the lamp housing is of a size considerably exceeding that of the transverse cross-section of the square portion of the bolt 24, so as to permit the lamp housing and the elements therein to be shifted on the bolt 24, for a purpose hereinafter to be described.

The lamp is mounted within the mudguard substantially above the front axle 14 of the automobile and is disposed, as clearly appears from Fig. 2 of the drawings, between the inner face of the mudguard and the adjacent front wheel of the motor vehicle. From Fig. 1 of the drawings it appears that the lamp is located above the front edge 11' of the mudguard, the latter forming thus a shield for substantially concealing the reflector and the light source from the eye of a person approaching the automobile from a position in front of the automobile. Glare or blinding effect, which is well known in connection with automobile lights, is thus effectively eliminated. The lamp is tilted slightly downwards (Fig. 1) so as to meet the roadway a substantial distance ahead of the motor vehicle. The position of the lamp in relation to the inner face of the front wheel 15 may be varied, the slot 23 in the section of the bracket 20 affording means for this purpose. The curved disks 34 and 38, bearing against the inner and outer faces, respectively, of the spherical portion of the lamp housing 25, in co-operation with the screw bolt 24, permit the lamp housing and the parts therein to be shifted in any desired direction in a vertical plane, and constitute thus a universal joint, permitting the lamp housing to be shifted to any desired angle of inclination in relation to the bracket.

What I claim is:—

The combination with a bracket having a longitudinal slot, of a lamp including a housing having an aperture in its wall, said housing being provided around said aperture with exterior and interior parallel spherical surfaces, a screw-bolt passing through the slot in said bracket and extended through said aperture into said housing, two spherical washers non-revolubly mounted on said bolt and fitted against the spherical surfaces of said housing, one of said washers being disposed within said housing and the other one on the outside of the same, said bolt having a head within said housing bearing against the interior washer, the exterior washer being provided with an outwardly dished portion bearing against one face of said bracket, and a wing-nut on said bolt bearing against the opposite face of said bracket for fixing the position of said bolt in said slot and for forcing said washers toward each other to clamp said housing, the spherical surfaces on said housing and said washers permitting said housing to be shifted to any desired angle of inclination in relation to said bolt and the outwardly dished portion of said exterior washer permitting shifting of said housing longitudinally on said bracket without changing its angle of inclination in relation to said bolt.

Signed at New York, in the county of New York, and State of New York, this 28th day of February, A. D. 1928.

CHARLES F. O'NEILL.